US006008977A

United States Patent [19]
Thatcher

[11] Patent Number: 6,008,977
[45] Date of Patent: Dec. 28, 1999

[54] ELECTRICAL SURGE ARRESTER

[75] Inventor: John Thatcher, Ivybridge, United Kingdom

[73] Assignee: Bowthorpe Components Limited, West Sussex, United Kingdom

[21] Appl. No.: 08/930,089

[22] PCT Filed: May 15, 1996

[86] PCT No.: PCT/GB96/01166

§ 371 Date: Nov. 12, 1997

§ 102(e) Date: Nov. 12, 1997

[87] PCT Pub. No.: WO96/36977

PCT Pub. Date: Nov. 21, 1996

[30] Foreign Application Priority Data

May 15, 1995 [GB] United Kingdom .................. 9509777

[51] Int. Cl.[6] ...................................................... H02H 1/00

[52] U.S. Cl. ........................................... 361/127; 361/117

[58] Field of Search ............................ 361/117–130, 56, 361/91, 111; 338/21

[56] References Cited

U.S. PATENT DOCUMENTS

| | | | |
|---|---|---|---|
| 3,665,255 | 5/1972 | Jakszt et al. | 361/128 |
| 4,262,318 | 4/1981 | Shirakawa et al. | 361/127 |
| 4,276,578 | 6/1981 | Levinson et al. | 361/127 |
| 4,326,232 | 4/1982 | Nishiwaki et al. | 361/127 |
| 4,814,936 | 3/1989 | Ozawa et al. | 361/127 |
| 4,853,670 | 8/1989 | Stengard | 338/21 |

*Primary Examiner*—Michael J. Sherry
*Attorney, Agent, or Firm*—David P. Gordon; David S. Jacobson; Thomas A. Gallagher

[57] ABSTRACT

An electrical surge arrester comprises a stack of varistors (10) separated by conductive spacers (12), the respective faces of the varistors and the spacers being bonded for electrical and physical contact, and the outer surfaces of the stack having an insulating coating (14). The varistors have different cross-sectional size from the spacers, the elements of larger size thereby providing the 'sheds' of the arrester.

15 Claims, 1 Drawing Sheet

ELECTRICAL SURGE ARRESTER

BACKGROUND OF THE INVENTION

1. Field of the Invention

This invention relates to electrical surge arresters, or diverters, and more particularly but not solely to electrical surge arresters for use in electrical power generation, transmission and distribution systems to protect such systems against power surges caused, for example, by lightning, and against over-voltages caused, for example, by switching operations.

2. State of the Art

Electrical surge arresters or diverters are well known for protecting equipment such as electrical power distribution systems and are generally connected in parallel with the equipment to be protected. A typical surge arrester provides a high or infinite impedance during normal system voltages in order to minimize steady-state losses. During surges, the arrester provides a low impedance in order to limit the voltage, and dissipates or stores the energy in the surge without damage to itself. After the passage of the surge, the arrester returns to open-circuit conditions.

A widely-used surge arrester comprises a plurality of non-linear voltage-dependent resistors contained within the bore of an externally shedded glazed porcelain insulator housing. The resistors are generally separated by discharging or spark gaps. During normal operating conditions the arrester has an infinitely high resistance so as to minimize steady-state losses of the equipment. However, in the event of a surge, the resistance of the arrester is substantially reduced such that the voltage is limited to acceptable levels to prevent damage to associated equipment, whilst the power follow current is sufficiently restricted to a level that can be cleared by the spark gaps.

The surge arrester described above is generally effective. However, under certain circumstances, the porcelain insulator housing may shatter, thereby scattering high temperature fragments, which is clearly dangerous.

Another type of electrical surge arrester, developed in order to overcome the problems associated with the arrester described above, consists of a unitary structural core comprising alternately stacked metal oxide varistor blocks and aluminium alloy heat-sink/spacer blocks. The opposed electrode surfaces of the individual varistor blocks are formed with metallised aluminium contacts and their sides are coated with an insulating material. The electrode surfaces of respective blocks are held in face-to-face physical and electrical contact by means of a silver loaded epoxy. The stack of blocks is coated with a glass-reinforced plastics shell and the whole assembly is encased in a heat-shrink or polymeric sleeve formed with alternating sections of greater and lesser diameter to provide 'sheds' for 'creepage'. In order to ensure that the interface between the heat-shrink sleeve and the glass-reinforced shell around the core is void-free, a mastic sealant is used within the heat-shrink sleeve. Finally, stainless steel end caps are provided at either end of the core as terminations. The surge arrester thus described operates in a similar manner to the type having a porcelain insulator housing, but has the added advantage that it has a non-explosive failure mode. It is relatively light, but is strong, resistant to damage and is unaffected by atmospheric pollutants or moisture ingress.

However, the latter surge arrester is of relatively complex construction and is expensive to manufacture. Another disadvantage of such a surge arrester is that, because the amount of energy dissipated by the device is dependent upon the size and number of varistor blocks, the device is often relatively large in order to accommodate particular applications. Further, air or moisture may become trapped between the glass-reinforced shell and the polymeric sleeve during manufacture, which may result in undesirable ionization effects.

SUMMARY OF THE INVENTION

We have now devised an electrical surge arrester which overcomes the problems outlined above.

In accordance with the present invention there is provided an electrical surge arrester comprising a stack comprising a plurality of varistors separated by conductive spacers, the respective faces of said varistors and said spacers being bonded for electrical and physical contact, said varistors being of different cross-section from said spacers, and the outer surfaces of said stack having an insulating coating.

The radially projecting portions of the stack form 'sheds' and are preferably sloped downwardly to disperse water from their surface.

The varistors may be of larger cross-section than the spacers. Thin, large diameter varistors have a much higher specific energy dissipation capability than varistor blocks such that the device may be made using a lower volume of active material, thereby allowing much smaller devices to be made. Also, a higher heat dissipation can be achieved because the internal elements of the arrester are separated from the external atmosphere by the insulating coating only. Alternatively, the varistors may be of smaller cross-section than the spacers.

The varistors preferably comprise discs and the spacers also preferably comprise discs, but other shapes may be used for the varistors and/or the spacers.

Preferably the varistors are formed of metal oxide or silicon carbide, and the spacers are preferably formed of aluminium. Where the varistors are formed of silicon carbide, the stack may also comprise one or more spark-gaps.

Preferably the varistors and the spacers are bonded by means of silver epoxy. Preferably the insulating outer coating on the stack comprises insulating epoxy coating. Preferably terminals are connected at either end of the stack.

Preferably an axial tie-rod passes through the stack of varistors and spacers and is secured at each end of the stack. Such an arrangement provides additional strengthening and may also provide a jig for assembly of the stack.

Also in accordance with the present invention there, is provided a method of manufacturing an electrical surge arrester, comprising the steps of assembling into a stack a plurality of varistors separated by conductive spacers, bonding for electrical and physical contact the respective faces of said varistors and said spacers, said varistors having a cross-section different from that of said spacers, and providing an insulating coating over the outer surfaces of the stack.

Due to the difference in cross-section or the varistors and the spacers, the elements of larger cross-section provide a foundation for the 'sheds' required for 'creepage'. Particular 'shed' requirements may be met by incorporating appropriately shaped elements into the stack. Hence the outer form of the arrester is immediately defined by the inner construction of varistors and spacers. Thus, the requirement for a suitably profiled sleeve is obviated and a single process, for example a 'dip' process, may be employed to coat the outer surfaces of the stack. The requirement for coating the individual varistors with insulating material prior to assembly is also eliminated. No sealants are required, as they are for application of the heat-shrink or polymeric sleeve in the prior art device described above, thereby eliminating the possibility of ionization effects due to trapped air or moisture.

The surge arrester of the present invention is therefore relatively simple and consequently relatively inexpensive to manufacture. Manufacturing costs may be further reduced, where the varistors are formed as flat elements e.g. discs, because flat varistors are substantially cheaper to manufacture than varistor blocks: flat varistors may be formed by 'autopressing' and the firing thereof is much quicker since they are thinner than blocks, and they can be stacked.

Preferably the varistors and the spacers are bonded by means of silver epoxy. Preferably the electrode faces of the individual varistors are formed by silver-screen printing or by aluminium arc or flame spraying. Preferably the insulating outer coating of the stack is applied by dipping the entire stack into insulating material. Preferably the insulating material comprises a fluidized bed of epoxy material or a liquid epoxy.

Embodiments of the present invention will now be described by way of examples only and with reference to the accompanying drawings.

DETAILED DESCRIPTION OF THE PREFERRED EMBODIMENT

Figure 1:
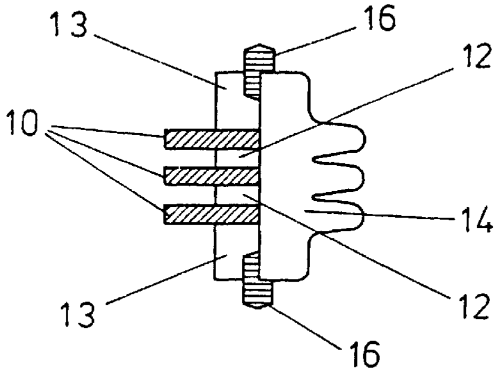
FIG. 1 is a cut-away side elevation of a first preferred embodiment of an electrical surge arrester in accordance with the present invention.
Figure 2:
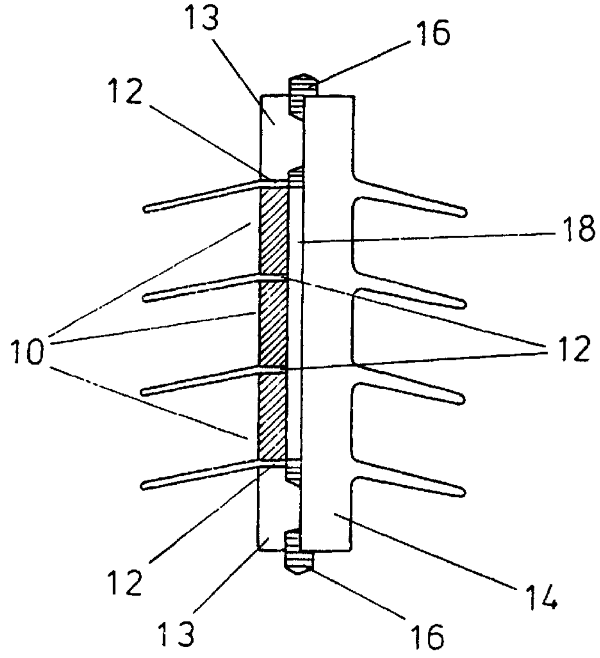
FIG. 2 is a cut-away side elevation of a second preferred embodiment of an electrical surge arrester; and, FIG. 3 is a circuit diagram of an electric power distribution equipment having a surge arrester connected thereto.

Referring to FIGS. 1 and 2 of the drawings, respective surge arresters, both in accordance with the present invention, each comprise a plurality of varistors 10, formed for example of metal oxide, which are separated by conductive spacers 12 such that a stack is formed. Spacer blocks 13 are also provided as terminators at each end of the stack. The respective faces of the varistors 10 and the spacers 12,13 are bonded in face-to-face physical and electrical contact by means of an adhesive, for example silver epoxy.

The stack of varistors and spacers 12 is covered with an insulating coating 14, for example an insulating epoxy coating, which follows the external profile of the stack so as to provide sheds in register with the radially projecting portions. It will be noted that the extreme ends of the terminating spacers blocks 13 are left uncovered such that terminals 16 may be connected thereto.

In the embodiment of FIG. 1, the varistors 10 comprise discs of greater diameter than the spacers 12, whereas in the embodiment of FIG. 2, the spacers 12 comprise discs of greater diameter than the varistors 10. In both cases, the larger diameter elements form 'sheds'. The upper surfaces of these 'sheds' are preferably sloped downwardly, as shown for the spacers 12 in FIG. 2, to more efficiently disperse rainwater etc.

Either arrangement may be chosen according to the intended application. However, thin, large-diameter varistor discs have a much higher specific energy dissipation capability than blocks, and therefore the arrester of FIG. 1 may be chosen in preference to that of FIG. 2 as it requires a lower volume of active material, and therefore allows surge arresters to be manufactured at a lower cost.

Also shown in FIG. 2 is an axial tie-rod 18 of insulating material which may pass through the center of each varistor 10 and each spacer 12 and is screw-threaded at each end of the stack to a respective terminating spacer 13. The tie-rod 18 provides additional strengthening and may also act as a jig when assembling the stack.

Figure 3:
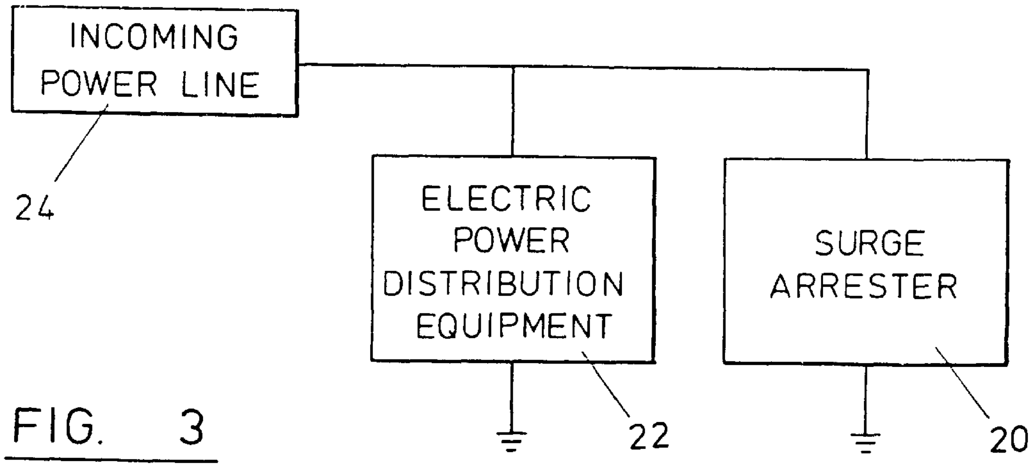

Referring to FIG. 3 of the drawings, in use, the surge arrester 20 described above is connected in parallel across electric power distribution equipment 22 between an incoming power line 24 and electrical ground. Under normal operating conditions, the arrester 20 is designed to provide a high or infinite impedance in order to minimise steady-state losses. However, in the event of an electrical surge or over-voltage, the impedance is reduced, thereby allowing current from the surge or over-voltage to pass through the arrester 20 to ground whilst limiting the voltage so as to enable it to dissipate the energy in the surge without damage to itself or other equipment. The number and size of the varistor discs 10 is chosen such that an appropriately high impedance is provided for normal operating conditions of the equipment 22, and such that a sufficiently low impedance is provided in the event or a surge or over-voltage.

The method of manufacture of an electrical surge arrester according to the present invention comprises the steps of rigging into a stack a plurality of varistors 10, separated by conductive spacers 12, providing terminating conductive spacer blocks 13 at either end of the stack and providing terminals 16 at the extreme ends of the terminating spacer blocks 13. The varistors 10, spacers 12, 13 and the terminals 16 are electrically connected and bonded together by means or an adhesive, for example silver loaded epoxy, such that the respective faces of the varistors 10, spacers 12, 13 and terminals 16 are held in face-to-face electrical and physical contact.

The stack is clamped at either end by a clamp having, for example, silicone rubber jaws, and any excess adhesive is either filleted into position or removed. The entire assembly is then heated in an oven and subsequently dipped into an insulating material, for example a fluidized bed of epoxy powder or a liquid epoxy, such that the insulating coating 14 is provided around the outer surface of the stack. Further coatings may be applied, as required, to provide additional strengthening, insulation etc.

Once the assembly has been allowed to cool, it is removed from the clamp and any insulating coating at the ends thereof is removed.

Thus, by using the radially projecting portions of the stack as a foundation to form the 'sheds', a single 'dip' process may be used to form the outer coating. No sealants are required, as they are for the application of the heat-shrink or polymeric sleeve in the prior art device described above, and this obviates the need for a vacuum. Also, the requirement for coating the individual varistors with insulating material prior to assembly is eliminated in the method of manufacture of the present invention.

The surge arrester of the present invention is therefore simple and consequently relatively inexpensive to manufacture. Manufacturing costs may be further reduced, where the varistors are formed as discs, because varistor discs are substantially cheaper to manufacture than blocks: discs may be formed by 'autopressing' and the firing thereof is quicker since they are much thinner than blocks.

Finally, since wide discs allow lower current density, the electric contact faces thereof may be manufactured by means of a silver silk screen process as opposed to an aluminium arc spray, which is substantially more expensive.

The surge arrester thus described is preferably formed from a plurality of metal oxide varistors e.g. zinc-oxide non-linear resistances. However, if the varistors were instead to comprise silicon carbide material, then a spark gap may also be provided, as part of the stack, for example by providing one or more pairs of opposed and spaced apart metallic electrodes in place of one or more varistors or spacers, the integrity of the stack being maintained by means of an annular support arranged between the two metallic electrodes.

Although the surge arrester of the present invention has been described for use with an electric power generation, transmission and distribution system, it will be appreciated that such an arrester could instead be designed for use with other types of electrical system in which it is desired to protect the system against surges or over-voltages. It will also be appreciated that an electrical surge arrester according to the invention could be used in both a.c. and d.c. systems.

I claim:

1. An electrical surge arrester comprising:

a stack of varistors seperated by conductive spacers, each of said varistors and said spacers having faces, said respective faces of said varistors and said spacers being bonded for electrical and physical contact, said varistors being of different cross-sectional size transverse a longitudinal axis of said stack relative to said spacers such that peripheral portions of said varistors project radially beyond the peripheries of said spacers, or such that peripheral portions of said spacers project radially beyond the peripheries of said varistors, said stack having an outer surface having an insulating coating applied therto, said insulating coating following an external profile of said stack to provide sheds in register with said radially projecting peripheral portions of said stack.

2. An electrical surge arrester as claimed in claim 1, wherein said varistors are of larger cross-sectional size than said spacers.

3. An electrical surge arrester as claimed in claim 2, wherein the radially projecting peripheral portions of said varistors slope downwardly away from the longitudinal axis of said stack.

4. An electrical surge arrester as claimed in claim 1, wherein said varistors are of smaller cross-sectional size than said spacers.

5. An electrical surge arrester as claimed in claim 4, wherein the radially projecting peripheral portions of said spacers slope downwardly away from the longitudinal axis of said stack.

6. An electrical surge arrester as claimed in claim 1, wherein said varistors comprise discs.

7. An electrical surge arrester as claimed in claim 1, wherein said spacers comprise discs.

8. An electrical surge arrester as claimed in claim 1, wherein said spacers are formed of aluminium.

9. An electrical surge arrester as claimed in claim 1, wherein said varistors are formed of a metal oxide.

10. An electrical surge arrester as claimed in claim 1, wherein said varistors are formed of silicon carbide.

11. An electrical surge arrester as claimed in claim 1, comprising one or more spark-gaps.

12. An electrical surge arrester as claimed in claim 1, wherein said varistors and said spacers are bonded together by silver epoxy.

13. An electrical surge arrester as claimed in claim 1, wherein said insulating coating on said stack comprises an insulating epoxy.

14. An electrical surge arrester as claimed in claim 1, comprising connecting terminals at either end of said stack.

15. An electrical surge arrester as claimed in claim 1, comprising an axial tie-rod extending through stack of varistors and spacers.

* * * * *